United States Patent [19]

Dunne

[11] 3,842,354

[45] Oct. 15, 1974

[54] DIGITAL SWEEP FREQUENCY GENERATOR EMPLOYING LINEAR SEQUENCE GENERATORS

[75] Inventor: Michael P. Dunne, Hudson, N.H.

[73] Assignee: Sanders Associates, Inc., Nashua, N.H.

[22] Filed: June 29, 1972

[21] Appl. No.: 267,715

[52] U.S. Cl. .................................... 328/14, 328/160

[51] Int. Cl. ............................................ H03b 19/00

[58] Field of Search .............. 328/14, 160; 331/1, 4, 331/47, 48, 51, 177, 178

[56] References Cited

UNITED STATES PATENTS

| | | | |
|---|---|---|---|
| 3,566,278 | 2/1971 | Noyes, Jr. | 328/14 |
| 3,641,442 | 2/1972 | Boucher | 328/14 |
| 3,671,871 | 6/1972 | Malm | 328/14 X |
| 3,702,441 | 11/1972 | Thrower | 328/14 |

*Primary Examiner*—Stanley D. Miller, Jr.
*Attorney, Agent, or Firm*—Louis Etlinger

[57] ABSTRACT

Digital sweep frequency generator which synthesizes the sample values of a swept frequency signal. A pair of linear sequence generators are employed as programmable frequency generators. One of the generators receives an initial value which is proportional to the starting sweep frequency to produce a set of sample values at first rate. The other generator responds to a value which is proportional to the sweep rate to generate a sequence of increment values at a rate somewhat slower than the rate employed by the first generator, which increment values are used to change the starting value to the first multiplier in equal increments.

The invention herein described was made in the course of or under a contract or subcontract thereunder with the Department of Navy.

2 Claims, 1 Drawing Figure

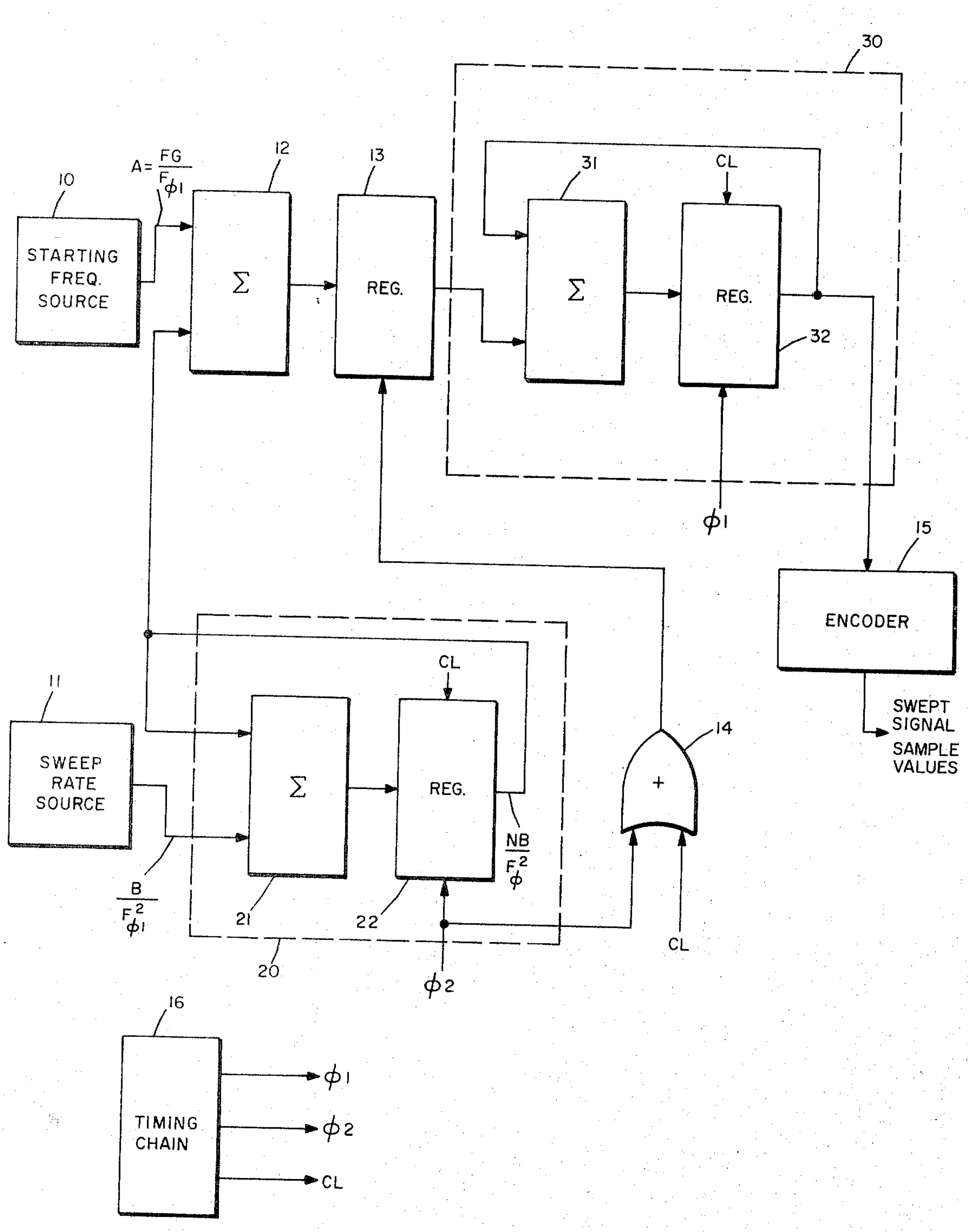
10
STARTING FREQ. SOURCE
A = FG / $F_{\phi 1}$
12
Σ
13
REG.
30
31
Σ
CL
REG.
32
φ1
15
ENCODER
SWEPT SIGNAL SAMPLE VALUES
11
SWEEP RATE SOURCE
B / $F^2_{\phi 1}$
20
21
Σ
22
CL
REG.
NB / $F^2_{\phi}$
φ2
14
+
CL
16
TIMING CHAIN
φ1
φ2
CL

DIGITAL SWEEP FREQUENCY GENERATOR EMPLOYING LINEAR SEQUENCE GENERATORS

The invention herein described was made in the course of or under a contract or subcontract thereunder with the Department of Navy.

BACKGROUND OF INVENTION

1. Field of Invention

This invention relates to sweep frequency generators. It relates more particularly to a generator which employs digital signal processing techniques to synthesize a set of sample values for a swept frequency signal.

In general, a sweep frequency generator provides an output signal which sweeps over a desired frequency range at a desired rate. Sweep frequency generators are useful, for example, in the local oscillator network of a receiver arranged for surveillance of a frequency band.

The sample values provided by the digital swept frequency generator of the present invention may be converted to a swept frequency signal as, for example, by a digital to analog converter.

2. Prior Art

In the prior art, it is known to employ a voltage controlled oscillator to obtain a swept frequency signal. The swept frequency output signal of this kind of generator is rather unstable due to temperature variation unless special attention is given to control temperature and/or its effect. In addition, the design of voltage controlled oscillator type swept frequency generators is generally specified for a particular sweep rate, starting frequency and frequency band. Different circuit designs are generally required to obtain different starting frequencies, sweep rates and/or frequency bands.

BRIEF SUMMARY OF INVENTION

An object of this invention is to provide novel and improved sweep frequency generator apparatus.

Another object is to provide sweep frequency generator apparatus in which the starting frequency, sweep rate and frequency band are all programmable.

Still another object is to provide frequency generator apparatus which employs digital signal processing techniques.

Yet another object is to provide a digital swept frequency generator apparatus which synthesizes a set of sample values for a swept frequency signal.

Briefly stated, a pair of linear sequence generators are employed as programmable frequency generators. One of the generators receives an initial value which is proportional to the starting sweep frequency to produce a set of sample values at a first rate. The other generator responds to a value which is proportional to the sweep rate to generate a sequence of increment values at a rate somewhat slower than the rate employed by the first generator which values are used to change the starting value to the first generator in equal increments.

BRIEF DESCRIPTION OF THE DRAWINGS

For a clearer understanding of the present invention, reference may be had to the following detailed description and the accompanying drawing, the sole FIGURE of which is a block diagram of a preferred embodiment.

DESCRIPTION OF PREFERRED EMBODIMENT

Referring now to the sole FIGURE of the drawing, sweep frequency generator apparatus embodying the invention includes a first linear sequence generator 30 which has its input value changed in equal increments by means of another linear sequence generator 20. The input value to each of these generators is a fraction such that the generator actually operates as a frequency divider to produce an output signal whose frequency is proportional to the rate input of the sequence generator. Thus, the frequency of the output of the generator 30 is some fraction of the frequency of the clock signal $\phi$1 which is supplied thereto as determined by the input value of the generator. Accordingly, each of the generators 20 and 30 is a programmable frequency generator.

The sequence generators 20 and 30 include adder networks 21 and 31 which have their outputs connected to registers 22 and 32, respectively. The outputs of the registers 22 and 32 are connected in loop arrangements at first inputs to their associated adders 21 and 31.

The starting frequency value of the sweep frequency generator apparatus is provided by means of a starting frequency source 10 via an adder 12 and a register 13 to the adder 31 of sequence generator 30. The starting frequency value A is changed in equal increments by the output of the sequence generator 20. The inputs to the adder 21 of generator 20 is provided by a sweep rate source 11. The sources 10 and 11 may be any suitable program value sources, such as selector switches, addressable memories, and the like. The starting frequency value is A=FG/F$\phi$1, where $F_G$ is the frequency of the generator signal and $F_{\phi 1}$ is the frequency of the clock signal $\phi$1 which clocks the register 32. The sweep rate value is $B/(F_{\phi 1})^2$ where B is the sweep rate in Hertz per second. The register 22 in the generator 20 is clocked at a slower rate by a clock signal $\phi$2 having a frequency $F_{\phi 2}$. A system timing chain 16 serves to provide the $\phi$1 and $\phi$2 clock signals together with a clear signal CL which serves to clear the registers of the sweep frequency generator apparatus and also to initiate a sweep. For example, timing chain 16 may suitably include an oscillator which drives a counter or series of counters (not shown) from which the signals $\phi$1, $\phi$2 and CL are derived.

When it is desired to initiate a sweep of a frequency band, the initial or starting frequency and the sweep rate are selected or provided by the sources 10 and 11 to the adder networks 12 and 21, respectively. The clear or CL signal is then generated to clear the registers 22 and 32. The CL signal is also applied via an OR gate 14 to the clock input of the register 13 so as to allow the starting value A to be loaded into the register 13 and to therefore become available at the input of the adder 31. The sequence generator 30 then commences to produce a sequence of values at a frequency corresponding to the starting value A. The numbers of the sequence or output values of register 32 represent phase values which can be converted by means of an encoder 15 to amplitude values of the output signal. For example, the encoder 15 may suitably comprise a look up table which is addressed by the phase or angle values from register 32 to provide at its output amplitude values of a sinusoid.

The sequence number generator 20 responds to the slower clock $\phi 2$ to change the starting value in equal increments once for each cycle of $\phi 2$. For instance, if the frequency $F_{\phi 2}$ is 1/8 of the frequency $F_{\phi 1}$, the starting value A will be changed in equal increments every 8 cycles of the clock $\phi 1$. This will cause the frequency of the signal represented by the outputs of the register 32 to increase in step wise fashion once every eight cycles of the clock $\phi 1$. The frequency sweep can then be stopped by merely interrupting the coupling of the clock signal $\phi 1$ and $\phi 2$ to the sweep frequency generator.

In the foregoing description, it was assumed that the frequency sweep was in the upper direction. That is, the frequency of the swept signal increased from an initial value to a final value. The frequency sweep can be made to go in a downward direction (decreasing frequency values) by merely employing the complements of the outputs of the sequence generator 20.

The adder, registers, encoder and logic gate shown in the drawing may take on any suitable form. For example, these circuit elements may be selected from any one or more of the following catalogs:

Texas Instrument Co. "$T^2L$", Raytheon Co. "Ray III" and Signetics "$T^2L$"

What is claimed is:

1. A sweep frequency generator comprising a timing source for producing first and second clock signals where the frequency of the second clock signal is lower than the frequency of the first clock signal;

a first linear sequence generator responsive to the first clock signal and to a start value to produce a set of values indicative of a signal having a frequency proportional to the start value; and means responsive to the second clock signal for modifying the start value by equal increments in every cycle of the second clock signal such that the outputs values of said first sequence generator represent a signal the frequency of which sweeps from said start value.

2. A sweep frequency generator as set forth in claim 1 wherein said means for modifying includes a second linear sequence generator which responds to said second clock signal and to a sweep rate value to produce a modifier value which is incremented by an equal amount once each cycle of the second clock and which further includes means for summing the modifier values with the start value so as to provide the summed value as an input to the first sequence generator.

* * * * *